United States Patent
Wang et al.

(10) Patent No.: US 9,631,925 B2
(45) Date of Patent: Apr. 25, 2017

(54) BUBBLE LEVEL AND APPARATUS CONTAINING A BUBBLE LEVEL

(71) Applicant: Mettler-Toledo AG, Greifensee (CH)

(72) Inventors: Changlin Wang, Shanghai (CN); Fanfeng Zu, Shanghai (CN); Hong Zhu, Shanghai (CN); Xiping Sheng, Shanghai (CN); Bing He, Shanghai (CN)

(73) Assignee: Mettler-Toledo GmbH, Greifensee (CH)

( * ) Notice: Subject to any disclaimer, the term of this patent is extended or adjusted under 35 U.S.C. 154(b) by 146 days.

(21) Appl. No.: 14/819,737

(22) Filed: Aug. 6, 2015

(65) Prior Publication Data
US 2016/0040989 A1    Feb. 11, 2016

(30) Foreign Application Priority Data
Aug. 8, 2014    (CN) .......................... 2014 1 0389066

(51) Int. Cl.
| G01C 9/26 | (2006.01) |
| G01C 9/32 | (2006.01) |
| G01C 9/06 | (2006.01) |
| G01C 9/36 | (2006.01) |

(52) U.S. Cl.
CPC ............. *G01C 9/32* (2013.01); *G01C 9/06* (2013.01); *G01C 9/36* (2013.01); *G01C 2009/066* (2013.01)

(58) Field of Classification Search
CPC .................................. G01C 9/26; G01C 9/32
USPC ..................... 33/348, 348.2, 366.12, 366.16
See application file for complete search history.

(56) References Cited

U.S. PATENT DOCUMENTS

| 3,020,506 | A | * | 2/1962 | Remington | ............... | G01C 9/18 |
| | | | | | | 200/193 |
| 4,494,620 | A | | 1/1985 | Knothe et al. | | |
| 4,956,922 | A | * | 9/1990 | Bodewes | ................. | G01C 9/06 |
| | | | | | | 33/348.2 |
| 6,248,989 | B1 | * | 6/2001 | Ohishi | ...................... | G01C 9/06 |
| | | | | | | 250/205 |
| 6,343,422 | B1 | * | 2/2002 | Takahashi | ................ | G01C 9/06 |
| | | | | | | 33/366.16 |

(Continued)

FOREIGN PATENT DOCUMENTS

| CN | 202204509 U | 4/2012 |
| DE | 42 37 953 C1 | 6/1994 |

(Continued)

*Primary Examiner* — G. Bradley Bennett
(74) *Attorney, Agent, or Firm* — Standley Law Group LLP

(57) ABSTRACT

An apparatus and method for measuring the horizontal position uses a gas bubble in a bubble level. The gas bubble is in a cylindrical sealed housing that is partially filled with liquid. At least two light-emitting devices are used to illuminate the gas bubble and an inner bottom surface of the bubble level. A corresponding number of receiving devices are used to receive the light that is either reflected by the inner bottom surface or is reflected and refracted by the gas bubble. The amount of light received is translated into an electrical signal and is sent to a processing unit to calculate the position of the gas bubble. The light-emitting devices and the receiving devices are disposed in an alternating manner at the periphery of the cylindrical sealed housing.

14 Claims, 5 Drawing Sheets

(56) References Cited

U.S. PATENT DOCUMENTS

| | | | | |
|---|---|---|---|---|
| 6,647,634 | B2 * | 11/2003 | Yang | G01C 9/32 |
| | | | | 33/366.16 |
| 6,681,494 | B1 * | 1/2004 | Bowden | G01C 9/24 |
| | | | | 33/379 |
| 6,995,323 | B2 | 2/2006 | Kunzi et al. | |
| 7,024,781 | B1 * | 4/2006 | Cowie | G01C 9/32 |
| | | | | 33/348 |
| 7,325,321 | B2 | 2/2008 | Künzi et al. | |
| 2002/0189116 | A1 * | 12/2002 | Yang | G01C 9/32 |
| | | | | 33/366.23 |
| 2007/0169362 | A1 * | 7/2007 | Perchak | G01C 9/06 |
| | | | | 33/366.16 |
| 2009/0293297 | A1 * | 12/2009 | Roemhild | G01C 9/06 |
| | | | | 33/366.16 |
| 2017/0003125 | A1 * | 1/2017 | Chi | G01C 9/34 |

FOREIGN PATENT DOCUMENTS

| | | |
|---|---|---|
| JP | 58-33114 A | 2/1983 |
| WO | 90/13792 A1 | 11/1990 |

* cited by examiner

BUBBLE LEVEL AND APPARATUS CONTAINING A BUBBLE LEVEL

CROSS-REFERENCE TO RELATED APPLICATIONS

This application is entitled to benefit of a right of priority under 35 USC §119 from Chinese Patent Application 201410389066.4, filed on 8 Aug. 2014, the content of which is incorporated by reference as if fully recited herein.

TECHNICAL FIELD

The invention relates to an apparatus and method for measuring the position of a gas bubble in a bubble level, and an apparatus containing a bubble level, and more particularly, to an apparatus and method for measuring the position of a gas bubble in a bubble level in the field of weighing instrument.

BACKGROUND

Many instruments and equipments can work properly only when they are put horizontally, such as electronic balances (i.e., weighing instruments) operating based on gravitation. There are errors when a balance is inclined. The more inclination the balance has, the larger the errors are. To maintain a certain level of precision, the balances must be kept within a certain horizontal range. Therefore, each of the balances is equipped with a bubble level and adjustable feet comprising height adjustment screws. Bubble levels comprise a sealed housing that is partially filled with liquid and contains a gas or air bubble. The upper part of the housing comprises a transparent window. The inside wall of the transparent window is a curved surface with a large radius. The gas bubble is located in the center of the bubble level when the device is aligned horizontally. The position of the gas bubble will move towards an upper direction when the device is inclined and not aligned horizontally. Users may observe the air bubble position, which indicated the inclined status of the electronic balance via the transparent window above the housing. Users may change the level status by adjusting the height of the adjustable feet by rotating the adjustment screw threads while observing the position of the gas bubble in the electronic balance until the gas bubble is located in the center of the bubble level.

Usually there is a marking circle on the transparent window of the bubble level. The level status is out of an acceptance range when the edge of the gas bubble exceeds the marking circle, and the weighing error will be too large, and the result will be unreliable. As a result, users have to position the gas bubble back into the marking circle, and preferably back to the center, by adjusting the level status.

It is well-known that three points can determine a plane. Therefore, a device that requires adjustment of the level status, such as an electronic balance, normally has three supporting points (i.e., three feet). One of the three feet is fixed, while the other two feet are adjustable. However, to those users who are less experienced, it is very difficult to adjust the level status by adjusting the height of those two feet based on the position of the gas bubble. Due to the triangle shape caused by the three feet, when the height of one foot is adjusted, the gas bubble moves in a diagonal direction. It is very inconvenient for the users.

Thus, an apparatus for automatically adjusting the level by motor control is contemplated. Or it is contemplated to send out an alarm as the gas bubble exceeds the marking circle so that the users may be prompted to roll the two adjustable feet to adjust the level status according to the position of the gas bubble. It is also contemplated to correct the weighing results according to the relationship between the incline status and weighing errors, and make the weighing results more precise by correcting the weighing results. Due to these and other reasons, it is desired to obtain the electronic data (value) of the level status (inclining status). A motor control system can determine how to adjust the mechanism only if it received the electronic signal or data of the level status. Patent CN100362326C discloses how to use electronic tilt sensor for alarming, amending the following weight, starting automatic calibration, and start the leveling guide, etc.

There are various methods and apparatuses for measuring the level status in the prior art.

Patent CN202204509U discloses a gas bubble electric-potential-type level sensor. Each electrode receives a different electric potential when the gas bubble is in different positions. The position of the gas bubble can be deferred from different electric potentials of electrodes. However, the liquid filled in the sealed housing must be conductive, and the electrodes also have to be inserted into the bubble level. It makes the manufacturing process very complex and is costly. The electrodes obstruct the visibility of the air bubble and interfere with users' observations.

Patent CN1645070A, i.e., US7325321 B2, discloses a method and apparatus for aligning an electronic balance. An inclination sensor is a gas-bubble-type level. A light-emitter emits light downwards from the top of a bubble level. There are at least three receiving devices installed below the bubble level. However, the light-emitter installed on the top influence the users' observations of the gas bubble to a certain extent.

Patent DE3234372A1 discloses a balance with an electronic inclination sensor. This electronic inclination sensor is a gas-bubble-type level. A light emitter emits the light upwards from the bottom of a bubble level. Receiving device(s) is installed at the upper of the bubble level, and severely interferes with users' observations of the gas bubble.

Patent JP58033114 discloses an apparatus with a gas bubble level. It is equipped with a lighting cell on one side and a plurality of optical sensors on the other side. This apparatus has a transparent cube. The lighting cell is installed on one side of the cube, while the plurality of optical sensors are installed on the other side of the cube. Due to the cubic structure, this apparatus is not suitable for 2-D level status.

SUMMARY

In order to address the above-identified drawback in the prior art, this invention provides an apparatus and method for measuring the position of a gas bubble in a bubble level and an apparatus containing a bubble level that ensures unobstructed visibility and allows users clear view to the gas bubble and its position while measuring the level status of the bubble level in an electronic or photo-electric manner.

According to an aspect of the present invention, it provides an apparatus for measuring the position of a gas bubble in a bubble level. The bubble level comprises a cylindrical shaped sealed housing. The cylindrical shaped sealed housing is partially filled with liquid and contains said gas bubble. The apparatus comprises at least two light-emitting devices and at least two light receiving devices. The light emitted from each light-emitting device illuminates the gas bubble and an inner bottom surface of the bubble level. The inner bottom surface is part of the sealed housing. In operating position the bottom surface is mainly aligned horizontally. In an advantageous embodiment the bottom surface is mainly a flat plane. However other shapes of the bottom surface are possible, e.g. a cone shape surface. On the top surface of the cylindrical shaped sealed housing a window is located. The window comprises a transparent material which allows the user to observe the location of the gas bubble and visual checking of the correct alignment of the apparatus. In operating position the window is mainly aligned horizontally. A cylindrical shaped side wall of the cylindrical shaped sealed housing encircles the bottom surface and the window. The bubble and the liquid are located between the bottom surface and the window. In operating position the cylindrical shaped side wall is mainly aligned vertically. The cylindrical shaped side wall and the bottom surface are arranged orthogonally to each other.

Each receiving device receives the light that is reflected by the inner bottom surface of the bubble level and reflected and refracted by the gas bubble and converts it into electrical signals. The electrical signals are processed for calculating the position of the gas bubble, wherein, each of the at least two light-emitting devices and each of the at least two receiving devices is alternately arranged at the periphery of the cylindrical shaped sealed housing. That is, the said light-emitting devices and the said receiving devices are arranged on a circle which is concentric with the cylindrical shaped sealed housing. Advantageously in operating position the circle is located in a mainly horizontally oriented plane.

According to an aspect of the present invention, the apparatus further comprises a light distributor. The light distributor obstructs partial light emitted from the light-emitting devices so that it would not illuminate an adjacent receiving device, allows the light emitted from the light-emitting devices directly illuminate on and around said gas bubble as much as possible, and allows the receiving devices receive the light on the surface of or around the gas bubble as much as possible.

According to an aspect of the present invention, the circular sidewall of the housing is transparent.

According to an aspect of the present invention, the circular sidewall of the housing is opaque. Each of the at least two light-emitting devices and each of the at least two receiving devices is alternately arranged at the periphery above the cylindrical shaped sealed housing. Ideally all the light-emitting devices and all the receiving devices are located on a circle in one horizontally aligned plane.

According to an aspect of the present invention, the apparatus comprises at least one of: two light-emitting devices and two receiving devices; three light-emitting devices and three receiving devices; four light-emitting devices and four receiving devices; five light-emitting devices and five receiving devices; or six light-emitting devices and six receiving devices.

According to an aspect of the present invention, the light-emitting devices and the receiving devices both are approximately uniformly-spaced.

According to an aspect of the present invention, the signal from each receiving device is recorded upon the illumination of each light-emitting device, M*N number of signals Uij are derived after each of the light-emitting devices having been illuminated once, where i=1 to M, j=1 to N, M is the number of light-emitting devices, N is the number of light receiving devices, the signals Uij are used to calculate the position of the gas bubble. Preferably the light-emitting devices emit light subsequently, which means one after the other light-emitting device is emitting light. That is the light-emitting devices do not emit light at the same time. The advantage of this approach is that the light emitted by a single light-emitting unit causes a signal at each light receiving device. Consequently each emitted light signal causes N light receiving signals and the signals can put into connection with each light emitting device. Hence, the calculation of the position of the bubble is based on more information, which leads to better results, or an accurate result can be achieved with less receiving devices.

According to an aspect of the present invention, a reference position of the gas bubble is defined, the signal U0ij of each receiving device when the gas bubble locates at the reference position is recorded, the differences between signals Uij and U0ij are used to calculate the position of the gas bubble, where i=1 to M, j=1 to N.

According to an aspect of the present invention, each light-emitting device is a light-emitting diode. Each light-emitting device emits light by lighting in successive pulses.

According to an aspect of the present invention, the light is visible light or infrared light.

According to an aspect of the present invention, each receiving device is a photodiode or a photo-triode or a called phototransistor.

The present invention also provides an apparatus comprising the inventive bubble level.

The present invention also provides a method for measuring the position of a gas bubble in a bubble level. The bubble level comprises a cylindrical shaped sealed housing. The sealed housing is partially filled with liquid and contains the gas bubble. The method comprises: alternately arranging at least two light-emitting devices and at least two receiving devices at the periphery of the cylindrical shaped sealed housing; recording the signal from each receiving device upon the illumination of each light-emitting device, and deriving M*N number of signals Uij after each of the light-emitting devices having been illuminated once, where i=1 to M, j=1 to N, M is the number of light-emitting devices, N is the number of receiving devices; and calculating the position of said gas bubble with the signals Uij.

According to an aspect of the present invention, the method further comprises: defining a reference position of the gas bubble, and recording the signal U0ij of each receiving device when the gas bubble locates at the reference position; and calculating the position of said gas bubble with the differences between signals Uij and U0ij, where i=1 to M, j=1 to N. The electrical signals are processed for calculating the position of the gas bubble.

The above general description and following detailed description of the present invention are exemplary and illustrative, and are intended to provide further explanations for the present invention as recited in the claims.

BRIEF DESCRIPTION OF DRAWINGS

The accompanying drawings are included to provide a further understanding of the present invention, and are included and formed as a part of the present application. Embodiments of the present invention are illustrated in accompanied drawings and are used to explain the principles of the present invention together with this description. In the drawings.

DETAILED DESCRIPTION

Embodiments of the present invention will now be described in detail in connection with the accompanied drawings.

The present invention provides an apparatus for measuring the position of a gas bubble in a bubble level. The bubble level comprises a cylindrical shaped sealed housing. The sealed housing is partially filled with liquid and contains the gas bubble. The apparatus comprises: at least two light-emitting devices and at least two receiving devices. The light emitted from each light-emitting device illuminates the gas bubble and an inner bottom surface of the bubble level. Each receiving device receives the light that is reflected by the inner bottom surface of the bubble level and reflected and refracted by the gas bubble and converts it into electrical signals. The electrical signals are processed for calculating the position of the gas bubble.

When the circumcircle of the housing is transparent, each of the at least two light-emitting devices and each of the at least two receiving devices is alternately located at the circumcircle of the cylindrical seal housing.

When the circumcircle of the housing is opaque, each of the at least two light-emitting devices and each of the at least two receiving devices is alternately located at the periphery of the upper location of the cylindrical sealed housing.

The benefit of said at least two light-emitting devices and at least two receiving devices being alternately located at the periphery is that the best observation window (above the center) is left to users while the position of the gas bubble is merely measured around the housing. Therefore, there are very few signals that can be derived if there is only one light-emitting device or only one receiving device. Thus, the performance is very poor and the apparatus is unpractical.

By having at least two light-emitting devices and at least two receiving devices evenly and alternately located, and in combination with reasonable algorithms (e.g., Least Square Method), better result can be derived. Normally, the more devices are used, the higher precision and better sensitivity on all directions could be derived, as well as the better performance.

Figure 1A:
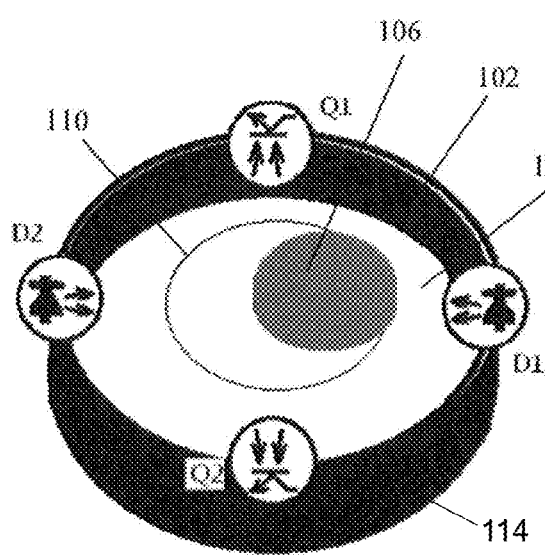
FIG. 1(a) shows a perspective view of an apparatus for measuring the position of a gas bubble in a bubble level and a bubble level containing the apparatus according to a first embodiment of the present invention.
Figure 1B:
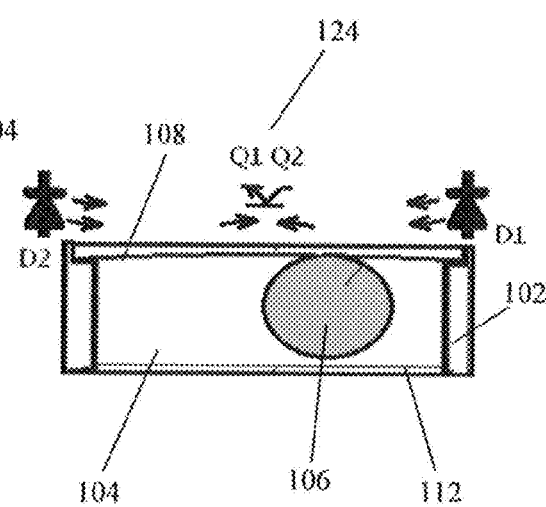
FIG. 1(b) shows a side sectional view of an apparatus for measuring the position of a gas bubble in a bubble level and a bubble level containing the apparatus according to a first embodiment of the present invention.

FIG. 1(a) shows a perspective view of an apparatus for measuring the position of a gas bubble in a bubble level and a bubble level containing the apparatus according to a first embodiment of the present invention. FIG. 1(b) shows a side sectional view of an apparatus for measuring the position of a gas bubble in a bubble level and a bubble level containing the apparatus according to a first embodiment of the present invention. According to the first embodiment of the present invention, an apparatus 100 for measuring the position of a gas bubble in a bubble level is provided. The bubble level comprises a cylindrical shaped sealed housing 102, which is partially filled with liquid 104 and contains a gas bubble 106. The apparatus 100 comprises two light-emitting devices D1, D2, and two receiving devices Q1, Q2. The light emitted from each light-emitting device D1, D2 illuminates the gas bubble 106 and the inner bottom surface 112 of the bubble level. Each receiving device Q1, Q2 receives the light that is reflected by the inner bottom surface 112 of the bubble level and reflected and refracted by the gas bubble 106 and converts it into electrical signals. The electrical signals are processed for calculating the position of said gas bubble 106.

In another embodiment, the circular side wall 114 of the housing 102 is opaque. Each of the two light-emitting devices D1, D2 and each of the two receiving devices Q1, Q2 is alternately located above the cylindrical shaped sealed housing 102. As shown in the FIG. 1(a), in the clockwise direction, there are receiving device Q1, light-emitting device D1, receiving device Q2, and light-emitting device D2. Meanwhile, users can clearly observe the gas bubble 106 and its position at the center via a transparent window 108 above the housing 102 of the bubble level.

In one embodiment, the circular side wall 114 of said housing 102 is transparent. Each of the two light-emitting devices D1, D2 and each of the two receiving devices Q1, Q2 is alternately located at the periphery of the cylindrically shaped sealed housing 102 (not shown in the figure), for example in the clockwise direction, there are receiving device Q1, light-emitting device D1, receiving device Q2, and light-emitting device D2 in turn. The light-emitting devices D1, D2 and the receiving devices Q1, Q2 must have be well positioned and mainly direct to the gas bubble 106 and its vicinity.

The two light-emitting devices D1, D2 and the two receiving devices Q1, Q2 can be distributed equidistantly over the circumference of the cylindrically shaped sealed housing. Hence the two light-emitting devices D1, D2 and the two receiving devices Q1, Q2 are located alternately by 90 degree. Four photo-electric signals (or values after AD conversion) may be derived when the gas bubble 106 locates at a certain position. In other words, when the first light-emitting device D1 is lighted, two photo-electric signals (or values) U11 and U12 could be derived. When the second light-emitting device D2 is lighted, another two photo-electric signals (or values) U21 and U22 could be derived. When the air bubble 106 is located at a different position, these four photo-electric signals or values, which could be recorded in advance, are different. During further usage, the four signals or values recorded in advance may be matched based on four photo-electric signals or values measured in real-time so as to obtain the current position of the gas bubble 106. Or, it could be used to determine whether the gas bubble 106 exceeds a marking circle 110. The four photo-electric signals or values may also be recorded in advance when the gas bubble 106 is located at a different position. Then, a common mathematical modeling method may be used to establish an empirical formula of the relationship between the four photo-electric signals and gas bubble position (X, Y) or the four photo-electric signals and the distance (R) between the gas bubble 106 and the center of the bubble level. During later usage, according to the four measured photo-electric signals, the current position (X, Y) of the gas bubble 106 could be obtained, or whether the gas bubble 106 exceeds the marking circle 110 may be determined.

For example, the value $U_{ij}$ is derived, where $i=1, 2; j=1, 2$, $$X=Kx11*U11+Kx12*U12+Kx21*U21+Kx22*U22$$

$$Y=Ky11*U11+Ky12*U12+Ky21*U21+Ky22*U22$$

Or, signal value $U0_{ij}$ could be measured and recorded in advance when the gas bubble 106 locates at a reference position, for example in the center of the bubble level. The difference between the signal value $U_{ij}$ measured in real-time and the signal value $U0_{ij}$ which is recorded in advance when the gas bubble 106 locates at the center is used to calculate the position of the gas bubble 106. In this way, the accuracy could be increased and the impact of temperature drift could be reduced.

$$X=Kx11*(U11-U011)+Kx12*(U12-U012)+Kx21*(U21-U021)+Kx22*(U22-U022)$$

$$Y=Ky11*(U11-U011)+Ky12*(U12-U012)+Ky21*(U21-U021)+Ky22*(U22-U022)$$

$$R=SQRT(X*X+Y*Y)$$

where:

$U0_{ij}$ are the four voltage values which are recorded in advance when the gas bubble 106 locates at the center, $i=1, 2, j=1, 2$.

$Kx_{ij}$ ($i=1,2; j=1,2$) means that $U_{ij}$ changes $1/Kx_{ij}$ volt when the position of the gas bubble 106 moves 1 mm in the X axis direction. $Ky_{ij}$ ($i=1,2; j=1,2$) means that $U_{ij}$ changes $1/Ky_{ij}$ volt when the position of the gas bubble 106 moves 1 mm in the Y axis direction. Both of them could be derived by experiments and methods such as Least Square Method.

Due to the symmetrical arrangement of all the light emitting and light receiving devices around the bubble level, (i.e., D1 and D2 locate at symmetric positions while Q1 and Q2 locate at symmetric positions), and due to Q1 and Q2 are the same type of device to have similar performance while D1 and D2 are the same type of device to have similar performance, the following results can be obtained always:

$$Kx11 \sim = -Kx22$$

$$Kx12 \sim = -Kx21$$

$$Ky11 \sim = -Ky22$$

$$Ky12 \sim = -Ky21$$

so:

$$X=Kx1*(U11-U011-U22+U022))+Kx2*(U12-U012-U21+U021)$$

$$Y=Ky1*(U11-U011-U22+U022))+Ky2*(U12-U012-U21+U021)$$

Since the same type of devices has similar temperature drifts, U11-U22 allows the temperature drifts of the two devices counteract with each other. So do U12-U21. Therefore, the method of the present invention could obtain stable results.

In an embodiment, each light-emitting device is an LED, which emits light by being lighted in turn by pulse.

In an embodiment, the light is visible light or infrared light. The advantage of visible light lies in that it can illuminate the bubble level while measuring the position of the gas bubble in a photo-electric manner so that users can clearly observe. The disadvantage of visible light lies in that it is vulnerable to ambient light and has higher power consumption and cost. The infrared light, which would not interfere with user's sight, is commonly used. Infrared light is less impacted by ambient light and has lower power consumption and cost.

In an embodiment, each receiving device is a Photo-diode or a Photo-triode. The sensitivity of Photo-triodes is high, and its followed circuit is simple.

In an embodiment, one light-emitting device and one receiving device could be assembled into one device. At least two such assembled devices are evenly disposed at the periphery of the bubble level.

Figure 1C:
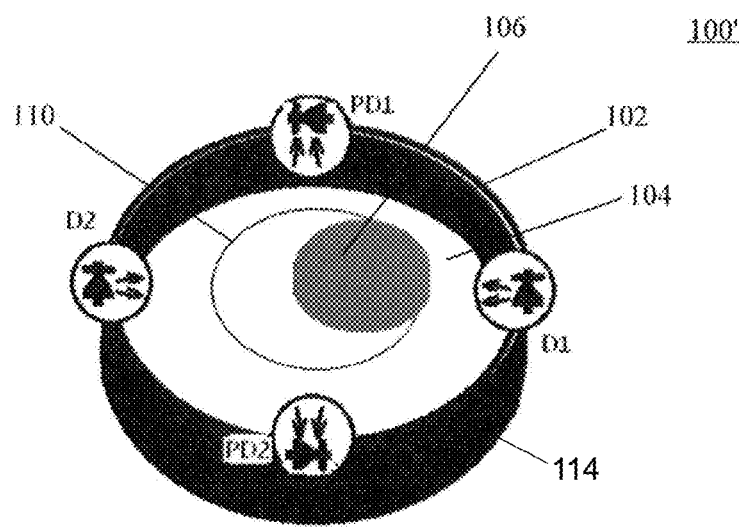
FIG. 1(c) shows a perspective view of an apparatus for measuring the position of a gas bubble in a bubble level and a bubble level containing the apparatus according to a second embodiment of the present invention.

FIG. 1(c) shows a perspective view of an apparatus 100' for measuring the position of a gas bubble in a bubble level according to a second embodiment of the present invention. The only difference between FIG. 1(c) and FIG. 1(a) is that photo-diodes PD1 and PD2 in FIG. 1(c) are used to replace the photo-triodes (phototransistors) Q1 and Q2 as receiving devices. The advantages of using photo-diodes are quick response and good linearity. The remaining devices and their configurations and calculation method of FIG. 1(c) are the same to those of FIG. 1(a), and thus are not redundantly described herein.

Figure 2:
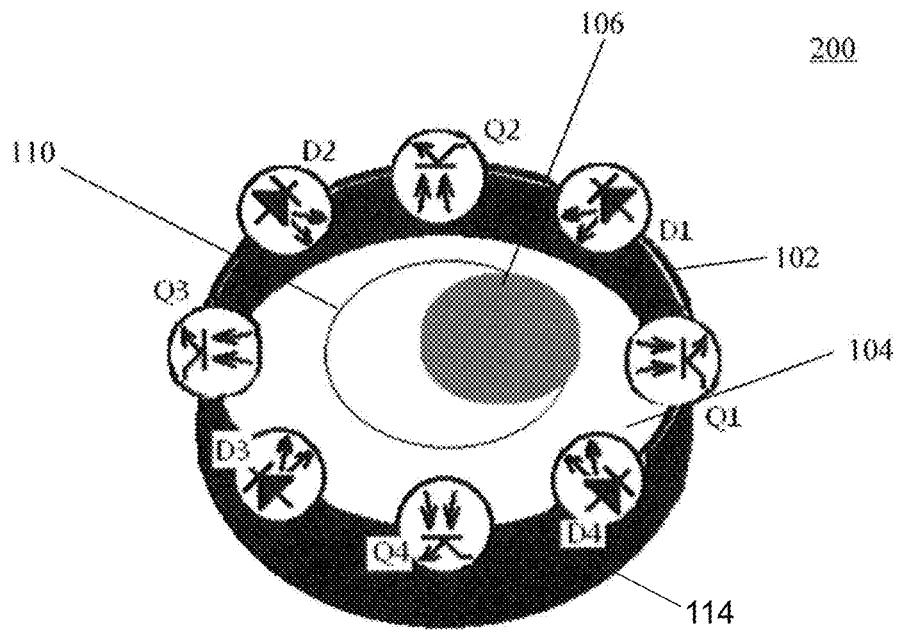
FIG. 2 shows a perspective view of an apparatus for measuring the position of a gas bubble in a bubble level and a bubble level containing the apparatus according to a third embodiment of the present invention.

FIG. 2 shows a perspective view of an apparatus 200 for measuring the position of a gas bubble in a bubble level according to a third embodiment of the present invention.

The apparatus 200 comprises four light-emitting devices D1-D4 and four receiving devices Q1-Q4.

Usually, the light-emitting devices D1-D4 are lighted by pulse so that their transient luminous intensity is much bigger than the ambient light intensity. Hence better signals could be obtained. Meanwhile, since there are a plurality of light-emitting devices D1-D4, these light-emitting devices D1-D4 should be lighted in turn to obtain high resolution. For example, for four light-emitting devices and four receiving devices, sixteen signals could be obtained if the light-emitting devices are lighted in turn. On the contrary, if the four light-emitting devices are lighted at the same time, only four signals could be obtained. As a result, the resolution and precision would be much worse. While the circuit is simple and calculation workload is less, the later disposition could only be applied in low requirement situations.

It is preferred that the four light-emitting devices D1-D4 and the four receiving devices Q1-Q4 are alternately and equidistantly located whereby the angle between two adjacent devices is 45 degree. The light-emitting devices and all the receiving devices are located in the same horizontally aligned plane. Sixteen photoelectric signals (or data values after A/D conversion) can be obtained when the gas bubble 106 locates at a certain position. The sixteen original photo-electric signals when the gas bubble 106 locates at different positions (such as 65 positions, R=0, and R=1, 2, 3, 4 mm, within 0 to 360 degree spaced by a 22.5 degree interval) may be recorded in advance. During later usage, the newly measured sixteen photo-electric signals are compared with the original sixteen signals (such as in 65 positions) recorded in advance to calculate the current position of the gas bubble 106 or to determine whether the gas bubble 106 exceeds the marking circle 110. Alternatively, the sixteen photo-electric signals when the gas bubble 106 locates at different positions may be recorded in advance and then a common mathematical modeling method (for example Least Square Method) may be used to build an empirical formula to give the relationship between the sixteen photo-electric signals and the gas bubble position (X, Y), or the distance (R) from the sixteen photo-electric signals and the gas bubble 106 to the center of the bubble level. During later usage, according to the newly measured 16 photo-electric signals Uij, the gas bubble 106 position (X, Y) could be directly calculated, or it may be determined whether the gas bubble 106 exceeds the marking circle 110. Two data values (X, Y) or just one data value (R) is obtained from the calculation of sixteen data values, resulting in strong anti-interference ability, high precision, good reliability, and even sensitivity in each direction. Also due to the symmetrical dispositions of D1-D4 and Q1-Q4 at the circumcircle of bubble level, Uij and U(i+2)(j+2) (i=1,2, j=1,2) usually change reversely when the position of the gas bubble 106 changes. Uij and U(i+2)(j−2) (i=1,2, j=3,4) usually change reversely as well. Then $$Kxij \sim = -Kx(i+2)(j+2), (i=1,2, j=1,2)$$

$$Kxij \sim = -Kx(i+2)(j-2), (i=1,2, j=3,4)$$

and $$Kyij \sim = -Ky(i+2)(j+2), (i=1,2, j=1,2)$$

$$Kyij \sim = -Ky(i+2)(j-2), (i=1,2, j=3,4)$$

So the temperature drifts in the apparatus are counteracted eventually. As more data values are calculated, the useful signals are strengthened while temperature drifts are counteracted. The result becomes more stable. The precision becomes higher.

While not shown in figures, another embodiment in which three light-emitting devices and three receiving devices are disposed alternately and equidistantly located at the circumcircle of the bubble level whereby the angle between two adjacent devices is 60 degrees. Nine photo-electric signals (or data after A/D conversion) could be obtained when the gas bubble 106 locates at a certain position. The problem is that the mathematical modeling will be a little more complex for the reason that the spacing angle is 60 degree instead of 90 degree which cannot coincide with both X-axis and Y-axis.

In another embodiment, five light-emitting devices and five receiving devices being alternately and equidistantly disposed at the circumcircle of the bubble level. Twenty-five photo-electric signals (or data after A/D conversion) could be obtained when the gas bubble 106 locates at a certain position. The precision is even higher except that the mathematical modeling will be more complex and the cost is also higher.

In another embodiment, six light-emitting devices and six receiving devices being alternately and equidistantly disposed at the circumcircle of the bubble level. 36 photo-electric signals (or data after A/D conversion) could be obtained when the gas bubble 106 locates at a certain position. The precision is even higher, especially for a bubble level with a larger diameter, except that the mathematical modeling will be more complex and the cost is also higher.

Figure 3:
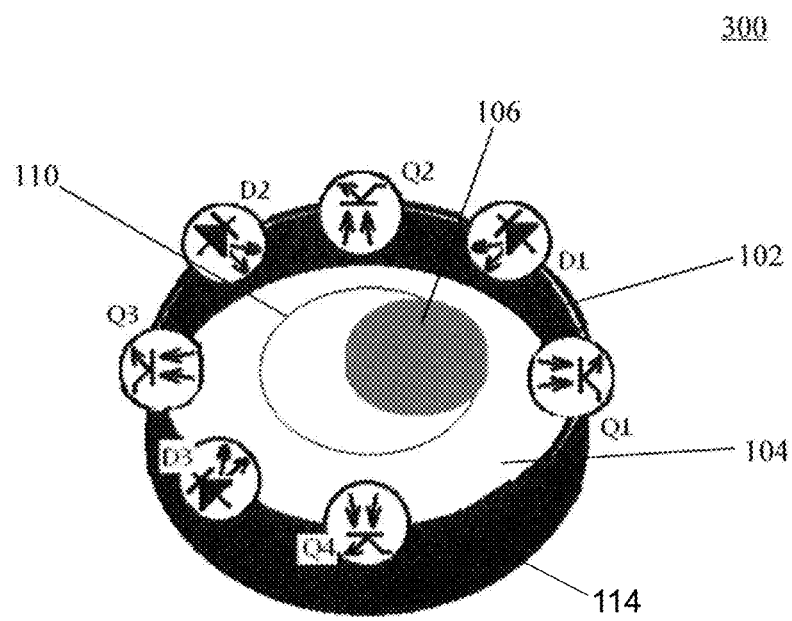
FIG. 3 shows a perspective view of an apparatus for measuring the position of a gas bubble in a bubble level and a bubble level containing the apparatus according to a fourth embodiment of the present invention.

FIG. 3 shows a perspective view of an apparatus 300 for measuring the position of a gas bubble in a bubble level according to a fourth embodiment of the present invention. As shown in FIG. 3, if the precision requirement is not very high, three light-emitting devices and four receiving devices being alternately and mostly equidistantly spaced whereby the angle between two adjacent devices is mostly 45 degrees. However, there is no light-emitting device in one 45 degree position. In other words, it is preferred that the plurality of light-emitting devices and receiving devices are alternately disposed as evenly as possible, but it is not entirely necessary. Compared to the previous embodiment, the calculation method will be more complex. But for a person skilled in the art, it can be contemplated with reference to the previous disclosure of the present invention.

Figure 4:
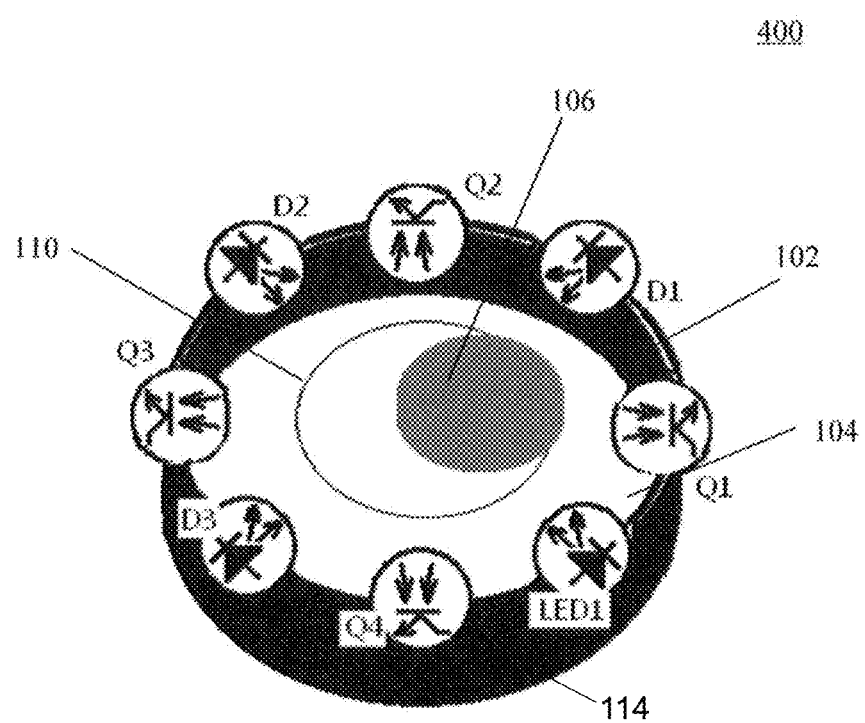
FIG. 4 shows a perspective view of an apparatus for measuring the position of a gas bubble in a bubble level and a bubble level containing the apparatus according to a fifth embodiment of the present invention.

FIG. 4 shows a perspective view of an apparatus 400 for measuring the position of a gas bubble in a bubble level according to a fifth embodiment of the present invention. The difference between FIG. 4 and FIG. 3 lies in that in FIG. 4, a visible light emitting device LED1 was placed in the 45 degree position which is left empty in FIG. 3. This visible light emitting device LED1 is used to illuminate the gas bubble 106 or for alarming. Meanwhile, the visible light emitting device LED1 is not used in measuring the position of the gas bubble 106. The remaining devices and their settings and calculation methods of FIG. 4 are all the same to those of FIG. 3, and thus are not redundantly described herein.

Figure 5A:
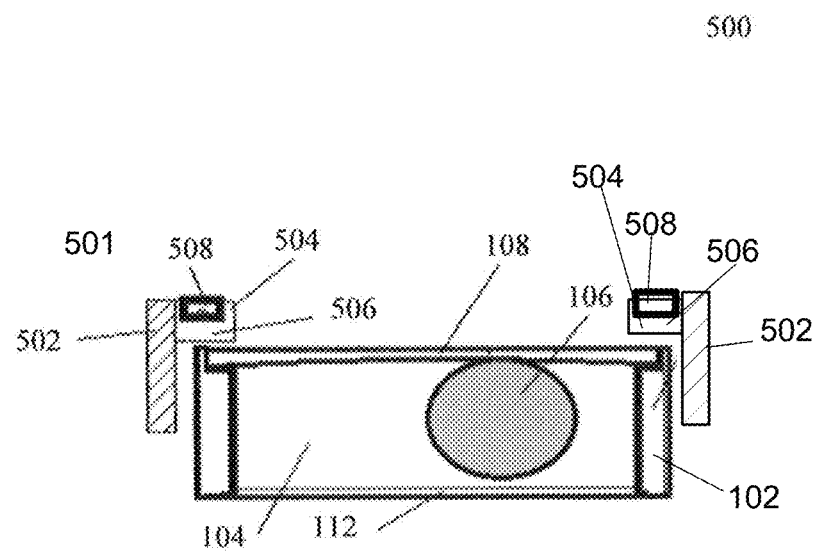
FIG. 5(a) shows a side sectional view an apparatus for measuring the position of a gas bubble in a bubble level and a bubble level containing the apparatus that has a light distributor equipped according to embodiments of the present invention.
Figure 5B:
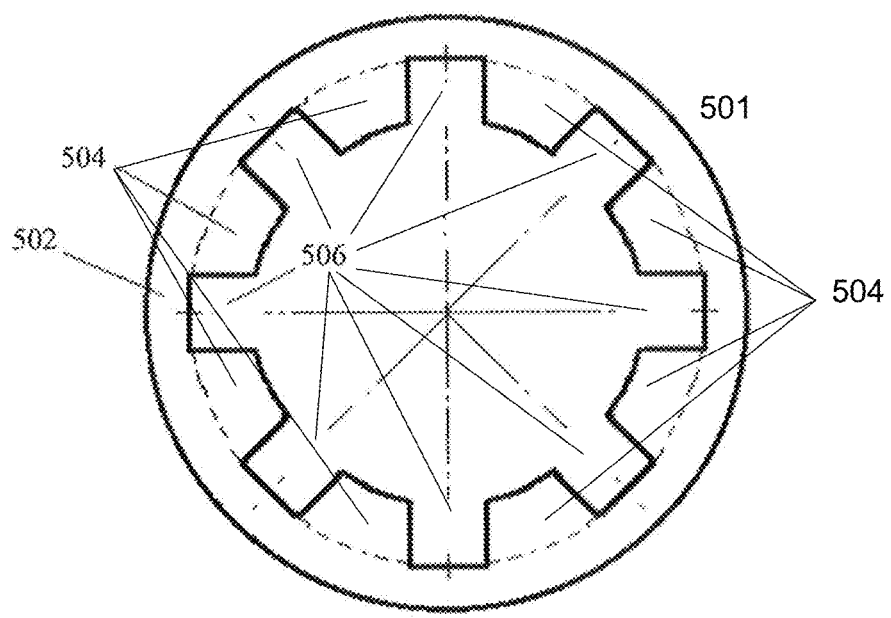
FIG. 5(b) shows a lateral sectional view of the light shielding effects of the light distributor according to embodiments of the present invention.

FIG. 5(a) shows a side sectional view of an apparatus 500 for measuring the position of a gas bubble in a bubble level that has a light distributor 501 equipped according to embodiments of the present invention. FIG. 5(b) shows a lateral sectional view of the light shielding effects of the light distributor 501 according to embodiments of the present invention.

The light distributor 501 is used to shield useless light and direct light to the gas bubble 106 and its vicinity. Users still can clearly see the gas bubble 106 and its position via the transparent window 108 on the top of the bubble level.

The light distributor 501 not only obstructs by the ledge part 504 partial light emitted from the light-emitting devices to prevent the light from directly radiating the adjacent receiving devices, but also leave out a light path (i.e., light guiding gap 506) to allow light emitted from said light-emitting devices 508 directly illuminate on and around the gas bubble 106 as much as possible, and to allow the light receiving devices 508 receive the light from the surface of or around the gas bubble 106 as much as possible. In the FIG. 5(a), 508 can represent either the light-emitting devices or the light receiving devices if it turns 45 degree. The light emitting and light receiving devices are placed alternately on the periphery of the window 108. This light distributor 501 can also comprise a shield element 502, which shields the impact from ambient light. The shield element 502 can be a circular shaped tube which is at least partially encloses the cylindrical shaped sealed housing 102. Advantageously the upper end of the sealed housing 102 is enclosed by the shield element 502. Ideally the shield element 502 is opaque or comprises a material with reduced light transmission properties. Ideally the ledges 504 are molded on the inner surface of the shield element 502. Between two neighboring ledges 504 a light guiding gap 506 is located. The light guiding gaps 506 and the ledges are arranged concentric with respect to the center of the cylindrical housing 102.

The light distributor 501 can optimize light path, increase performance and reduce the impact from disturbing light while strengthening useful signals. Then stable results with high precision are obtained. To install the light-emitting devices and receiving devices in a convenient manner, small light-emitting devices and receiving devices with larger scattering angle (such as ±70 degree) could be installed horizontally and the light axis is directed downward towards the inner bottom surface 112. Then light distributor 501 can shield useless light while the light guiding gap 506 allows useful light pass through (by utilizing the feature of larger scattering angle). Thus a very good result can be obtained. Those small light-emitting devices or receiving devices with larger scattering angle and forward light axis are common in the market, so the cost is very low. Please note, in FIG. 5(a), 508 can represent either the light-emitting devices or the light receiving devices if it turns 45 degree. The present invention requires a very small additional height of the bubble level, which wouldn't interfere with users' observation of the position of the gas bubble 106. This is another advantage of the present invention.

However, the light distributor 501 is not necessary if the performance requirement is not so high or the light-emitting devices 508 and receiving devices 508 themselves have good directivity which exactly direct to the position of the gas bubble 106.

In theory, it is preferred that the light axis of the light-emitting devices and receiving devices is downward but deviates 45 degrees toward the gas bubble 106. But those types of devices are rare in the market. Or they have to be customized, which result in high cost.

Figure 6:
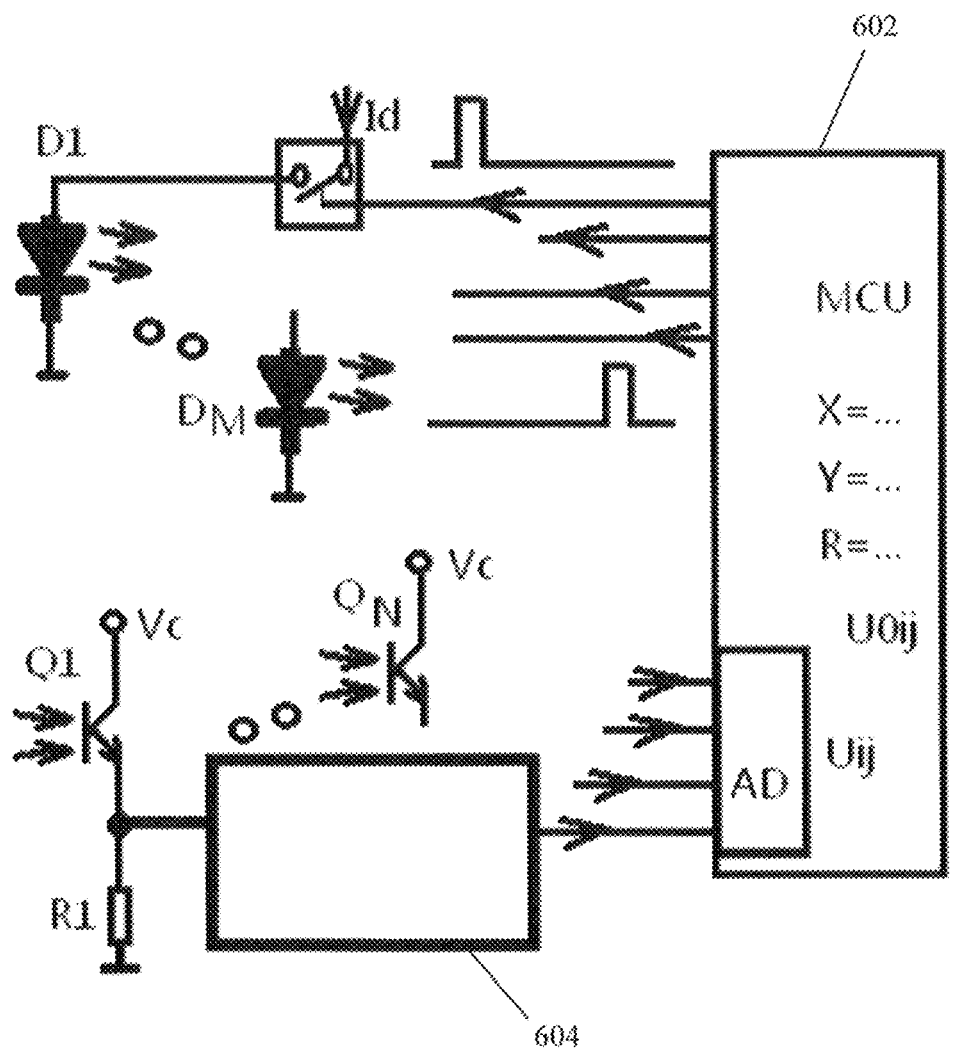
FIG. 6 shows the connection diagram between the apparatus for measuring the position of a gas bubble in a bubble level and related circuits according to embodiments of the present invention.

FIG. 6 shows the connection diagram between the apparatus for measuring the position of a gas bubble in a bubble level and related circuits according to embodiments of the present invention. As shown in FIG. 6, controlling signals to light-emitting devices D1-DM are sent by MCU 602 (or CPU, or some other devices). The signals arrive at the switch driving circuit Id to light the light-emitting devices D1 to DM in turn. Various conditioning circuits 604 can be inserted between each of the receiving devices Q1 and the analog to digital convertor AD, for example, filtering circuit and amplifier, etc. These are common for those ordinarily skilled in the art. MCU 602 utilizes the result from the analog to digital convertor AD to calculate the deviation position (X, Y) of the gas bubble, or the distance (R) between the position of the gas bubble and the center of the bubble level. The result is used for level status display, inclination alarming, feedback input of level controlling system, or weighting result correction, start the leveling guide, etc.

The present invention relates to an apparatus and method for measuring the position of a gas bubble in a bubble level and a bubble level comprising the apparatus. The present invention is used for inclination alarming of a balance or gas bubble position display (which can be used to instruct users to conveniently adjust the balance to its level status), feedback input of level controlling system, or weighting result correction, etc. Meanwhile, it ensures users can clearly observe the gas bubble and its position of a physical bubble level. It brings excellent user experiences and convenient application. The apparatus has simple construction, low cost, reliable result, and high precision.

Those skilled in the art may readily understand that the above exemplary embodiments of the present invention can have various modifications and variations without departing from the spirit and scope of the present invention. Therefore, the present invention is intended to cover the modifications and variations that fall within the scope as recited in the claims and its equivalents.

What is claimed is:

1. An apparatus for determining horizontal position, based on calculations made by a processing unit, using a bubble level that comprises a housing that sealingly contains a liquid that only partially fills an interior of the housing, so that the housing also contains a gas bubble, the housing having a cylindrical side wall, an bottom surface and a transparent upper surface through which the gas bubble is observed, the apparatus comprising:
   at least two light-emitting devices, each arranged to illuminate the gas bubble and the bottom surface of the housing with the light emitted therefrom; and
   at least two receiving devices, each arranged to receive light that is reflected by the bottom surface and/or reflected and refracted by the gas bubble, each receiving device configured to convert the received light into electrical signals for processing by the processing unit, the respective light-emitting devices and receiving devices in alternating arrangement around a periphery of the housing.

2. The apparatus of claim 1, further comprising:
   a light distributor, shaped and positioned to allow light emitted by each light-emitting device to directly illuminate the gas bubble, such that the receiving devices receive the light reflected and/or refracted on the surface of or around the gas bubble, while obstructing direct illumination by each light-emitting device of any receiving device adjacent thereto.

3. The apparatus of claim 2, wherein:
   the light distributor comprises, as a shield element, a circular shaped tube that at least partially encloses the housing.

4. The apparatus of claim 3, wherein:
   the cylindrical side wall is transparent.

5. The apparatus of claim 3, wherein:
   the cylindrical side wall is opaque; and
   each of the light-emitting devices and each of the receiving devices is arranged at the periphery of the upper surface of the housing.

6. The apparatus of claim 5, wherein:
   there are between two and six light-emitting devices and there is one receiving device for each of the light emitting devices.

7. The apparatus of claim 1, wherein:
   the light-emitting devices and the receiving devices are spaced uniformly around a circle that is concentric with the housing.

8. The apparatus of claim 1, wherein:
   each light-emitting device comprises a light-emitting diode that emits light in successive pulses.

9. The apparatus of claim 1, wherein:
   each light-emitting device emits infrared light.

10. The apparatus of claim 1, wherein:
    each receiving device is a photodiode or a photo-triode (phototransistor).

11. The apparatus of claim 4, wherein:
    there are between two and six light-emitting devices and there is one receiving device for each of the light emitting devices.

12. A bubble level comprising the apparatus of claim 1.

13. A method for determining horizontal position of a device having a bubble level, the method comprising the steps of:
    providing an apparatus according to claim 1, where the apparatus has M light-emitting devices and N light-receiving devices;
    generating a set of M*N signals $U_{ij}$ by emitting a light pulse from each of the light-emitting devices and recording the signal from each of the light receiving devices, such that $U_{ij}$ represents the signal received at the jth light-receiving device of the light pulse from the ith light-emitting device; and calculating, in a processing unit, the horizontal position of the device based on the signals Uij.

14. The method of according to claim 13, further comprising the steps of:

defining a reference position of the gas bubble;

generating a set of M*N signals $U0_{ij}$ by emitting a light pulse from each of the light-emitting devices when the gas bubble is in the reference position and recording the signal from each of the light receiving devices, such that $U0_{ij}$ represents the signal received at the jth light-receiving device of the light pulse from the ith light-emitting device when the gas bubble is in the reference position; and calculating, in the processing unit, the position of the gas bubble, based on differences between signals Uij and U0ij for identical values of I and j.

* * * * *